(12) United States Patent
Kageyama et al.

(10) Patent No.: US 11,834,549 B2
(45) Date of Patent: Dec. 5, 2023

(54) METHOD FOR PRODUCING POLYMERIZABLE COMPOSITION

(71) Applicant: HOYA LENS THAILAND LTD., Pathumthani (TH)

(72) Inventors: Yukio Kageyama, Shinjuku-ku (JP); Masahide Yamada, Shinjuku-ku (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 426 days.

(21) Appl. No.: 16/642,802

(22) PCT Filed: Mar. 29, 2019

(86) PCT No.: PCT/JP2019/014060
§ 371 (c)(1),
(2) Date: Feb. 27, 2020

(87) PCT Pub. No.: WO2019/189785
PCT Pub. Date: Oct. 3, 2019

(65) Prior Publication Data
US 2020/0247942 A1    Aug. 6, 2020

(30) Foreign Application Priority Data

Mar. 29, 2018  (JP) ................................. 2018-066228

(51) Int. Cl.
| | | |
|---|---|---|
| C08G 18/38 | (2006.01) | |
| G02B 1/04 | (2006.01) | |
| C08G 18/76 | (2006.01) | |
| B29D 11/00 | (2006.01) | |
| C08G 18/10 | (2006.01) | |
| C08K 5/3475 | (2006.01) | |
| B29K 75/00 | (2006.01) | |

(52) U.S. Cl.
CPC .... C08G 18/7642 (2013.01); B29D 11/00009 (2013.01); C08G 18/10 (2013.01); C08G 18/3876 (2013.01); C08K 5/3475 (2013.01); G02B 1/041 (2013.01); *B29K 2075/00* (2013.01)

(58) Field of Classification Search
CPC ............... C08G 18/7642; C08G 18/10; C08G 18/3876; G02B 1/041
See application file for complete search history.

(56) References Cited

U.S. PATENT DOCUMENTS

| | | | | |
|---|---|---|---|---|
| 8,044,165 | B2 * | 10/2011 | Kawaguchi | .......... C08G 18/758 |
| | | | | 568/57 |
| 8,434,866 | B2 * | 5/2013 | Hayashi | ............... C08G 18/242 |
| | | | | 428/423.1 |
| 2013/0267673 | A1 * | 10/2013 | Takemura | .............. C08G 75/00 |
| | | | | 528/58 |
| 2013/0303721 | A1 * | 11/2013 | Jang | ....................... G02B 1/041 |
| | | | | 528/59 |
| 2014/0296431 | A1 | 10/2014 | Kousaka | |
| 2017/0057184 | A1 * | 3/2017 | Kakinuma | ......... C08G 18/2027 |
| 2019/0062489 | A1 * | 2/2019 | Kageyama | ........... C08G 18/758 |

FOREIGN PATENT DOCUMENTS

| | | |
|---|---|---|
| JP | H10-058551 A | 3/1998 |
| JP | 2006-162926 A | 6/2006 |
| JP | 2011-079894 A | 4/2011 |
| JP | 2014-502657 A | 2/2014 |
| WO | 2008/047626 A1 | 4/2008 |

OTHER PUBLICATIONS

Jun. 11, 2019 International Search Report issued in International Patent Application No. PCT/JP2019/014060.

* cited by examiner

Primary Examiner — Michael L Leonard
(74) Attorney, Agent, or Firm — Oliff PLC

(57) ABSTRACT

A method for producing a polymerizable composition, the method including: step (1) of preparing composition A having a water content of 200 ppm by mass or less, the composition A including a polyisocyanate component but not including a polymerization catalyst; step (2) of preparing composition B having a water content of 1,000 ppm by mass or less, the composition B including a polythiol component; and step (3) of mixing the composition A and the composition B and obtaining a polymerizable composition, and also a method for producing an optical component, the method including: a step of injecting the above-mentioned polymerizable composition into a molding die; and a step of polymerizing the polymerizable composition.

7 Claims, No Drawings

METHOD FOR PRODUCING POLYMERIZABLE COMPOSITION

TECHNICAL FIELD

The present disclosure relates to a method for producing a polymerizable composition to be used for an optical component such as a spectacle lens, and a method for producing an optical component.

BACKGROUND ART

Lenses made of resins are advantageous in that the lenses are lightweight compared to lenses formed from inorganic materials such as inorganic glass, are not easily crackable, and can be dyed. Therefore, currently, it is the mainstream to use a lens made of a resin as an optical component such as a spectacle lens or a camera lens.

In Patent Literature 1, as a method capable of satisfactorily producing a high-performance polyurethane-based resin optical material that is colorless, transparent, and free of distortion without causing striae or white turbidity, a method for producing a resin for an optical material by polymerizing a polymerizable composition formed from a polythiol compound and a polyiso(thio)cyanate compound, the polymerizable composition having a moisture content of 10 to 300 ppm, is described.

CITATION LIST

Patent Literature

Patent Literature 1: WO 2008/047626 A

SUMMARY OF INVENTION

Technical Problem

As disclosed in Patent Literature 1, striae and white turbidity are suppressed by adjusting the moisture content of the polymerizable composition to 10 to 300 ppm; however, there is a problem that changes over time in the polymerizable composition are noticeable, and when several hours elapse from the preparation of the polymerizable composition, striae are likely to be generated at the time of producing an optical component.

Thus, an embodiment of the present disclosure relates to a method for producing a polymerizable composition that suppresses the generation of striae at the time of obtaining an optical component even if the polymerizable composition is stored for a long time period after preparation, and a method for producing an optical component.

Solution to Problem

The inventors of the present invention analyzed all the causes with regard to the production process for an optical component and found that the problems described above can be solved by preparing, at the time of preparing a polymerizable composition, a composition including a polyisocyanate component and having a low water content, further preparing a composition including a polythiol component and having a low water content, and then mixing these compositions.

An embodiment of the present disclosure relates to:
a method for producing a polymerizable composition, the method including:
step (1) of preparing composition A having a water content of 200 ppm by mass or less, the composition A including a polyisocyanate component but not including a polymerization catalyst;
step (2) of preparing composition B having a water content of 1,000 ppm by mass or less, the composition B including a polythiol component; and
step (3) of mixing the composition A and the composition B and obtaining a polymerizable composition.

An embodiment of the present disclosure relates to:
a method for producing an optical component, the method including:
a step of injecting the above-mentioned polymerizable composition into a molding die; and
a step of polymerizing the polymerizable composition.

Advantageous Effects of Invention

According to an embodiment of the present disclosure, a method for producing a polymerizable composition that suppresses the generation of striae at the time of obtaining an optical component even if the polymerizable composition is stored for a long time period after preparation, and a method for producing an optical component, can be provided.

DESCRIPTION OF EMBODIMENTS

[Method for Producing Polymerizable Composition]

The method for producing a polymerizable composition according to an embodiment of the present disclosure includes:
step (1) of preparing composition A having a water content of 200 ppm by mass or less, the composition A including a polyisocyanate component but not including a polymerization catalyst;
step (2) of preparing composition B having a water content of 1,000 ppm by mass or less, the composition B including a polythiol component; and
step (3) of mixing the composition A and the composition B and obtaining a polymerizable composition.

By having the above-described configuration, a method for producing a polymerizable composition that suppresses the generation of striae at the time of obtaining an optical component even if the polymerizable composition is stored for a long time period after preparation, and a method for producing an optical component, can be provided.

Thereby, co-presence of a polyisocyanate component and water in the presence of a polymerization catalyst is avoided, a reaction of the polyisocyanate with water can be suppressed, and thus production of amines that exert significant influence on striae can be suppressed. Furthermore, the generation of urea is also suppressed thereby, and reduction of cloudiness is also enabled.

<Step (1)>

In step (1), composition A having a water content of 200 ppm by mass or less, which includes a polyisocyanate component and does not include a polymerization catalyst, is prepared. By having this step, a polymerizable composition which suppresses the generation of striae at the time of obtaining an optical component even if the polymerizable composition is stored for a long time period after preparation, is obtained.

From the viewpoint of suppressing the generation of striae at the time of obtaining an optical component even if the composition is stored for a longer time period, the water content of the composition A after reduction is preferably 150 ppm by mass or less, more preferably 100 ppm by mass or less, even more preferably 80 ppm by mass or less, still more preferably 40 ppm by mass or less, and even more preferably 30 ppm by mass or less, with respect to the composition A.

From the viewpoint of productivity, the water content of the composition A may be, for example, 1 ppm by mass or more, or may be 5 ppm by mass or more, with respect to the composition A.

Meanwhile, the method for measuring the water content of the composition A is based on the method described in Examples.

When it is said that "composition A having a water content of 200 ppm by mass or less is prepared", it is acceptable as long as the composition A is prepared such that the water content has a predetermined value or less without depending on the means, and for example, (i) reducing the water content by subjecting the composition A to reduced pressure conditions, or (ii) mixing a polyisocyanate component having a low water content with additives and dissolving the mixture, are included. Among these, (i) is preferred.

In the case of (i) reducing the water content by subjecting the composition A to reduced pressure conditions, the pressure is preferably 1,000 Pa or less, more preferably 800 Pa or less, even more preferably 500 Pa or less, and still more preferably 300 Pa or less, and is preferably 10 Pa or more, more preferably 50 Pa or more, and even more preferably 100 Pa or more.

In the case of (ii) mixing a polyisocyanate component having a low water content with additives and dissolving the mixture, the polyisocyanate component is disposed in advance under reduced pressure conditions, and thereby the water content is reduced. The conditions are similar to those described above. In the case of (ii), even for the additives to be added, it is preferable to use additives having reduced water contents.

Meanwhile, as shown in (ii), even in a case in which a polyisocyanate component and additives having their water contents reduced in advance are used, after the polyisocyanate component and the additives are mixed, the water content may be further reduced as disclosed in (i).

In step (1), it is preferable that the various components of composition A that will be described below are added and uniformly dissolved.

[Composition A]

Composition A includes a polyisocyanate component but does not include a polymerization catalyst. The polymerization catalyst is, for example, the polymerization catalyst that will be described below.

(Polyisocyanate Component)

Examples of the polyisocyanate component include a polyisocyanate compound having an aromatic ring, an alicyclic polyisocyanate compound, and a linear or branched aliphatic polyisocyanate compound.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenyl isocyanate), 4,4'-methylenebis(2-methylphenyl isocyanate), bibenzyl-4,4'-diisocyanate, bis(isocyanatophenyl)ethylene, 1,3-bis(isocyanatomethyl)benzene, 1,4-bis(isocyanatomethyl)benzene, 1,3-bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl) ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methyloxy-4-isocyanatophenyl) disulfide, and bis(4-methyloxy-3-isocyanatophenyl) disulfide.

Examples of the alicyclic polyisocyanate compound include 1,3-diisocyanatocyclohexane, isophorone diisocyanate, 1,3-bis(isocyanatomethyl)cyclohexane, 1,4-bis(isocyanatomethyl)cyclohexane, dicyclohexylmethane-4,4'-diisocyanate, 2,5-bis(isocyanatomethyl)-bicyclo[2,2,1]heptane, 2,6-bis(isocyanatomethyl)-bicyclo[2,2,1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato 4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octanediisocyanate, 1,2-diisothiocyanatoethane, and 1,6-diisothiocyanatohexane.

These may be used singly or in combination of two or more kinds thereof.

The polyisocyanate component preferably includes at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate;

more preferably includes at least one selected from the group consisting of 1,3-bis(isocyanatomethyl)benzene, hexamethylene diisocyanate, and 1,3-bis(isocyanatomethyl)cyclohexane; and even more preferably includes 1,3-bis(isocyanatomethyl)benzene. The amount of the above-mentioned preferred polyisocyanate component is preferably 50% by mass or more, more preferably 70% by mass or more, even more preferably 90% by mass or more, still more preferably 95% by mass or more, and 100% by mass or less, among the polyisocyanate components. The amount of the polyisocyanate components in the composition A is preferably 50% by mass or more, more preferably 70% by mass or more, even more preferably 90% by mass or more, still more preferably 95% by mass or more, and preferably 99.9% by mass or less, more preferably 99.5% by mass or less, and even more preferably 99.0% by mass or less.

(Mold Release Agent)

The composition A preferably includes a mold release agent in addition to the polyisocyanate component. As the composition A includes the mold release agent, the polyisocyanate component is stabilized, and the generation of striae at the time of obtaining an optical component can be suppressed even if the polymerizable composition is stored for a longer time period.

Examples of the mold release agent include acidic phosphoric acid esters such as an acidic phosphoric acid alkyl ester. The number of carbon atoms in an alkyl group of the acidic phosphoric acid alkyl ester is preferably 1 or greater, and more preferably 4 or greater, and the number of carbon atoms is preferably 20 or less, and more preferably 12 or less.

The acidic phosphoric acid ester may be either a phosphoric acid monoester or a phosphoric acid diester; however, a mixture of a phosphoric acid monoester and a phosphoric acid diester is preferred.

Examples of the acidic phosphoric acid alkyl ester include isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate.

The amount of addition of the mold release agent is preferably 0.01 parts by mass or more, more preferably 0.05 parts by mass or more, and even more preferably 0.08 parts by mass or more, and still more preferably 0.10 parts by mass or more, and is preferably 1.00 part by mass or less, more preferably 0.50 parts by mass or less, and even more preferably 0.30 parts by mass or less, with respect to a total amount of 100 parts by mass of the polythiol component and the polyisocyanate component.

(Ultraviolet Absorber)

The composition A preferably includes an ultraviolet absorber in addition to the polyisocyanate component. An ultraviolet absorber becomes easily dissolvable by being incorporated into the composition A.

Examples of the ultraviolet absorber include a benzotriazole-based compound, a benzophenone-based compound, dibenzoylmethane, and a dibenzoylmethane-based compound. Among these compounds, a benzotriazole-based compound or a benzophenone-based compound is preferred.

Examples of the benzotriazole-based compound include 2-(2-hydroxy-5-methylphenyl)-2H-benzotriazole, 2-(2-hydroxy-3,5-di-tert-butylphenyl)-5-chloro-2H-benzotriazole, 2-(3-t-butyl-2-hydroxy-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-octylphenyl)-2H-benzotriazole, 2-(2-hydroxy-4-ethyloxyphenyl)-2H-benzotriazole, 2-(2-hydroxy-4-propyloxyphenyl)-2H-benzotriazole, 2-(2-hydroxy-4-octyloxyphenyl)-2H-benzotriazole, and 2-(2-hydroxy-4-octyloxyphenyl)-5-chloro-2H-benzotriazole.

Examples of the benzophenone-based compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methoxybenzophenone.

Examples of the dibenzoylmethane-based compound include 4-tert-butyl-4'-methoxydibenzoylmethane.

These may be used singly or in combination of two or more kinds thereof.

The amount of addition of the ultraviolet absorber is preferably 0.01 parts by mass or more, more preferably 0.10 parts by mass or more, even more preferably 0.30 parts by mass or more, and still more preferably 0.40 parts by mass or more, and is preferably 5 parts by mass or less, more preferably 3 parts by mass or less, and even more preferably 2 parts by mass or less, with respect to a total amount of 100 parts by mass of the polythiol component and the polyisocyanate component.

The composition A may include other additives such as, for example, an antioxidant, a coloration inhibitor, and a fluorescent brightening agent. These may be used singly or in combination of two or more kinds thereof.

<Step (2)>

In step (2), composition B having a water content of 1,000 ppm by mass or less, which includes a polythiol component, is prepared. By having this step together with step (1), a polymerizable composition that suppresses the generation of striae at the time of obtaining an optical component even if the polymerizable composition is stored for a long time period after preparation, is obtained.

From the viewpoint of suppressing the generation of striae after storage for a long time period, the water content of the composition B after this step (2) is preferably 900 ppm by mass or less, and more preferably 800 ppm by mass or less, with respect to the composition B, and from the viewpoint of suppressing the generation of white turbidity, the water content is more preferably 600 ppm by mass or less, even more preferably 500 ppm by mass or less, still more preferably 300 ppm by mass or less, and more preferably 100 ppm by mass or less, and even more preferably 50 ppm by mass or less.

From the viewpoint of productivity, the water content of the composition B may be, for example, 1 ppm by mass or more, or may be 5 ppm by mass or more, with respect to the composition B.

Meanwhile, the method for measuring the water content of the composition B follows the method described in the Examples.

The preparation of the composition B is not particularly limited; however, for example, the composition B can be prepared by a method similar to that for the composition A as described above. Among the preparation methods, method (i) as described above is preferred.

In step (2), it is preferable that the various components of the composition B as will be described below are added and uniformly dissolved.

[Composition B]

Composition B includes a polythiol component.

(Polythiol Component)

Examples of the polythiol component include an ester compound of a polyol compound and a mercapto group-containing carboxylic acid compound, a linear or branched aliphatic polythiol compound, a polythiol compound having an alicyclic structure, and an aromatic polythiol compound.

Regarding the ester compound of a polyol compound and a mercapto group-containing carboxylic acid compound, examples of the polyol compound include a compound having two or more hydroxyl groups in the molecule.

Examples of the polyol compound include ethylene glycol, diethylene glycol, propanediol, propanetriol, butanediol, trimethylolpropane, bis(2-hydroxyethyl) disulfide, pentaerythritol, and dipentaerythritol.

Examples of the mercapto group-containing carboxylic acid compound include thioglycolic acid, mercaptopropionic acid, a thiolactic acid compound, and thiosalicylic acid.

Examples of the ester compound of a polyol compound and a mercapto group-containing carboxylic acid compound include ethylene glycol bis(2-mercaptoacetate), ethylene glycol bis(2-mercaptopropionate), diethylene glycol bis(2-mercaptoacetate), diethylene glycol bis(2-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(2-mercaptopropionate), pentaerythritol tetrakis(3-mercaptopropionate), dipentaerythritol hexakis(2-mercaptoacetate), and dipentaerythritol hexakis(3-mercaptopropionate).

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, 2-(2-mercaptoethylthio) propane-1,3-dithiol, 2,2-bis(mercaptomethyl)-1,3-propanedithiol, bis(mercaptomethylthio)methane, tris(mercaptomethylthio)methane, bis(2-mercaptoethylthio)methane, 1,2-bis(mercaptomethylthio)ethane, 1,2-bis(2-mercaptoethylthio)ethane 1,3-bis(mercaptomethylthio) propane, 1,3-bis(2-mercaptoethylthio)propane, 1,1,2,2-tetrakis(mercaptoethylthio)ethane, 1,1,3,3-tetrakis (mercaptoethylthio)propane, 3-mercaptomethyl-1,5-dimercapto-2,4-dithiapentane, tetrakis(mercaptoethylthio) propane, bis(2-mercaptoethyl) ether, bis(2-mercaptoethyl) sulfide, bis(2-mercaptoethyl) disulfide, bis(2-mercaptoethylthio)-3-mercaptopropane, 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, and 5,7-bis (mercaptomethyl)-3,6,9-trithia-1,11-undecanedithiol.

Examples of the polythiol compound having an alicyclic structure include 1,1-cyclohexanedithiol, 1,2-cyclohexanedithiol, methylcyclohexanedithiol, bis(mercaptomethyl) cyclohexane, 2-(2,2-bis(mercaptomethylthio)ethyl)-1,3-dithietane, 2,5-bis(mercaptomethyl)-1,4-dithiane, and 4,8-bis(mercaptomethyl)-1,3-dithiane.

Examples of the aromatic polythiol compound include 1,3-dimercaptobenzene, 1,4-dimercaptobenzene, 1,3-bis (mercaptomethyl)benzene, 1,4-bis(mercaptomethyl)benzene, 1,3-bis(mercaptoethyl)benzene, 1,4-bis(mercaptoethyl)benzene, 1,3,5-trimercaptobenzene, 1,3,5-tris (mercaptomethyl)benzene, 1,3,5-tris(mercaptoethyl) benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methyloxyphenyl)propane-2,2-dithiol, 1,3-diphenylpropane-2,2-dithiol, phenyl methane-1,1-dithiol, and 2,4-di(p-mercaptophenyl)pentane.

These may be used singly or in combination of two or more kinds thereof.

The polythiol component preferably includes at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis (mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate);

more preferably includes at least one selected from the group consisting of 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, 4-mercaptomethyl-1,8-dimercapto-3,6-dithiaoctane, pentaerythritol tetrakis(3-mercaptopropionate), 2,5-bis (mercaptomethyl)-1,4-dithiane, and pentaerythritol tetrakis(2-mercaptoacetate); and even more preferably includes at least one selected from the group consisting of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol; and still more preferably, the polythiol component is a mixture of 4,7-bis(mercaptomethyl)-3,6,9-trithia-1,11-undecanedithiol, 4,8-bis(mercaptomethyl)-3,6,9-trithia-1, 11-undecanedithiol, and 5,7-bis(mercaptomethyl)-3,6, 9-trithia-1,11-undecanedithiol.

The amount of the above-mentioned preferred polythiol component is preferably 50% by mass or more, more preferably 70% by mass or more, even more preferably 90% by mass or more, still more preferably 95% by mass or more, and 100% by mass or less, among the polythiol components.

The amount of the polythiol component in the composition B is preferably 50% by mass or more, more preferably 70% by mass or more, even more preferably 90% by mass or more, still more preferably 95% by mass or more, and 100% by mass or less.

(Polymerization Catalyst)

The composition B preferably includes a polymerization catalyst. As the polymerization catalyst is incorporated not into the composition A but into the composition B, the generation of striae at the time of obtaining an optical component is more noticeably suppressed even if the polymerizable composition is stored for a long time period after preparation.

Examples of the polymerization catalyst include a tin compound and a nitrogen-containing compound.

Examples of the tin compound include an alkyl tin compound and an alkyl tin halide compound.

Examples of the alkyl tin compound include dibutyl tin diacetate and dibutyl tin dilaurate.

Examples of the alkyl tin halide compound include dibutyl tin dichloride, dimethyl tin dichloride, monomethyl tin trichloride, trimethyl tin chloride, tributyl tin chloride, tributyl tin fluoride, and dimethyl tin dibromide.

Among these, dibutyl tin diacetate, dibutyl tin dilaurate, dibutyl tin dichloride, and dimethyl tin dichloride are preferred, and dimethyl tin dichloride is more preferred.

Examples of the nitrogen-containing compound include a tertiary amine, a quaternary ammonium salt, an imidazole-based compound, and a pyrazole-based compound. The tertiary amine is preferably a hindered amine.

Examples of the tertiary amine include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane (DABCO).

Examples of the hindered amine include 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl]methyl]butyl malonate, and tetrakis(1,2,2,6,6-pentamethyl-4-piperidyl)butane-1,2,3,4-tetracarboxylate.

Examples of the quaternary ammonium salt include tetraethylammonium hydroxide.

Examples of the imidazole-based compound include imidazole, 1,2-dimethylimidazole, benzylmethylimidazole, and 2-ethyl-4-imidazole.

Examples of the pyrazole-based compound include pyrazole and 3,5-dimethylpyrazole.

Among these, a tertiary amine such as a hindered amine, an imidazole-based compound, and a pyrazole-based compound are preferred, and a hindered amine is more preferred.

The amount of addition of the polymerization catalyst is preferably 0.001 parts by mass or more, more preferably 0.005 parts by mass or more, and even more preferably 0.007 parts by mass or more, and is preferably 2 parts by mass or less, more preferably 1 part by mass or less, and even more preferably 0.5 parts by mass or less, with respect to a total amount of 100 parts by mass of the polythiol component and the polyisocyanate component.

<Step (3)>

In step (3), the composition A and the composition B are mixed, and a polymerizable composition is obtained.

[Polymerizable Composition]

The polymerizable composition includes a polythiol component and a polyisocyanate component.

The equivalent ratio between mercapto groups of the polythiol component and isocyanate groups of the polyisocyanate component (mercapto groups/isocyanate groups) is preferably 40/60 or higher, more preferably 43/57 or higher, even more preferably 45/55 or higher, and is preferably 60/40 or lower, more preferably 55/45 or lower, and even more preferably 53/47 or lower.

The total amount of the polythiol component and the polyisocyanate component in the polymerizable composition is preferably 50% by mass or more, more preferably 70% by mass or more, even more preferably 90% by mass or more, and still more preferably 95% by mass or more, and is preferably 99.9% by mass or less, and more preferably 99.6% by mass or less.

With regard to the polymerizable composition, a suitable combination of the polythiol component and the polyisocyanate component may be, for example, 1,3-bis(isocyanatomethyl)benzene with a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

From the viewpoint of suppressing the generation of white turbidity, the water content of the polymerizable composition is preferably 800 ppm by mass or less, more preferably 600 ppm by mass or less, even more preferably 500 ppm by mass or less, still more preferably 300 ppm by mass or less, and even more preferably 250 ppm by mass or less.

From the viewpoint of productivity, the water content of the polymerizable composition may be, for example, 1 ppm by mass or more, or may be 5 ppm by mass or more.

Meanwhile, the method for measuring the water content of the polymerizable composition follows the method described in the Examples.

The polymerizable composition may be further subjected to reduced pressure conditions, from the viewpoint of further suppressing the generation of striae and white turbidity.

The pressure under the reduced pressure conditions is preferably 10 Pa or higher, more preferably 50 Pa or higher, even more preferably 100 Pa or higher, and is preferably 1,000 Pa or lower, more preferably 800 Pa or lower, and even more preferably 500 Pa or lower.

[Method for Producing Optical Component]

In the following description, a method for producing an optical component according to an embodiment of the present disclosure will be described in more detail.

The method for producing an optical component according to an embodiment of the present disclosure includes, for example:

a step of injecting the above-mentioned polymerizable composition into a molding die (hereinafter, also referred to as "injection step"); and a step of polymerizing the polymerizable composition (hereinafter, also referred to as "polymerization step").

<Injection Step>

In the injection step, for example, the polymerizable composition thus obtained is injected into a molding die.

In a case in which a spectacle lens is produced as an optical component, for example, a molding die comprising a pair of molds that form two principal surfaces of the spectacle lens; and a tape or a gasket, which separates and fixes these molds, is used. Furthermore, the above-mentioned molds may be made of glass or may be made of a metal.

Prior to the injection into the molding die, the polymerizable composition may be filtered. The filtration method is not particularly limited; however, filtration may be performed using, for example, a filter having a pore diameter of 1 to 30 μm.

<Polymerization Step>

In the polymerization step, for example, the polymerizable composition is polymerized by heating.

Polymerization conditions can be appropriately set in accordance with the polymerizable composition and the shape of the optical component to be formed.

The polymerization initiation temperature is usually from 0° C. to 50° C., and preferably from 5° C. to 30° C. It is preferable that the temperature is raised from the polymerization initiation temperature, and then heating is performed to achieve curing and formation. For example, the highest temperature after the temperature rise is usually 110° C. to 130° C. The polymerization time from the initiation to the completion of polymerization is, for example, 3 to 96 hours.

After completion of the polymerization, the optical component may be released from the molding die and then subjected to an annealing treatment. The temperature of the annealing treatment is preferably 100° C. to 150° C.

By the method described above, a resin for an optical component is obtained.

[Optical Component]

Examples of the optical component include a spectacle lens, a camera lens, a prism, an optical fiber, a substrate for a recording medium used for an optical disc, a magnetic disk or the like, and an optical filter attached to a computer display. Among these, a spectacle lens is preferred.

A spectacle lens preferably comprises a lens substrate formed from this optical component (hereinafter, also referred to as "spectacle lens substrate").

The surface shape of the spectacle lens substrate is not particularly limited and may be any one of a flat surface, a convex surface, a concave surface, or the like.

The spectacle lens substrate may be any one of a fixed focus lens, a multifocal lens, a progressive addition lens, and the like. For example, as an example, in a progressive addition lens, a near portion area (near portion) and a corridor area (intermediate area) are usually included in a lower area, and a distance portion area (distance portion) is included in an upper area.

The spectacle lens substrate may be a finish type spectacle lens substrate or a semi finish type spectacle lens substrate.

The thickness of the geometric center and the diameter of the spectacle lens substrate are not particularly limited; however, the thickness of the geometric center is usually about 0.8 to 30 mm, and the diameter is usually about 50 to 100 mm.

The refractive index ($n_e$) of the spectacle lens substrate is, for example, 1.53 or higher, 1.55 or higher, 1.58 or higher, or 1.60 or higher, and the refractive index is, for example, 1.75 or lower, or 1.70 or lower.

The spectacle lens preferably comprises a spectacle lens substrate and a functional layer on the surface of the spectacle lens substrate.

As the functional layer, for example, at least one selected from the group consisting of a hard coat layer, a primer layer, an antireflection film, and a water repellent film may be used.

The hard coat layer is provided so as to enhance scratch resistance, and preferably, the hard coat layer can be formed by applying a coating solution containing an organosilicon compound, or a microparticulate inorganic material such as tin oxide, silicon oxide, zirconium oxide, or titanium oxide.

The primer layer is provided so as to enhance impact resistance, and includes, for example, polyurethane as a main component. Here, the content of polyurethane is preferably 50% by mass or more in the primer layer.

Examples of the antireflection film include films obtained by laminating inorganic materials such as silicon oxide, titanium dioxide, zirconium oxide, and tantalum oxide.

The water repellent film can be formed using an organosilicon compound containing a fluorine atom.

[Spectacles]

Spectacles according to an embodiment of the present invention have spectacle lenses and a frame in which these spectacle lenses are mounted.

The frame has, for example, a pair of rims, a bridge provided between the rims, and a pair of temples respectively provided at one end of each of the rims.

The rims may be half rims.

The frame may be a so-called rimless frame. In this case, for example, the spectacles have a pair of spectacle lenses, a bridge provided between the spectacle lenses, and a pair of temples respectively provided at one end of each of the spectacle lenses.

EXAMPLES

Hereinafter, specific Examples will be described in connection with embodiments of the present disclosure; however, the present claims are not intended to be limited by the following Examples. Unless particularly stated otherwise, the operations and evaluations described below were carried out in air at room temperature (about 20° C. to 25° C.). Furthermore, unless particularly stated otherwise, the units "%" and "parts" described below are on a mass basis.

[Measurement Method]

<Water Content>

In a glove box in an environment at a temperature of 25° C. and a relative humidity of 6% or less, a Karl Fischer moisture meter "MKC-610" (manufactured by Kyoto Electronics Manufacturing Co., Ltd.) connected to a moisture vaporizer "ADP-611" (Kyoto Electronics Manufacturing Co., Ltd.) was disposed. Using the moisture vaporizer and the Karl Fischer moisture meter, the apparatuses were operated at a temperature of 125° C. for 20 minutes without inserting a measurement sample, the value indicated by the Karl Fischer moisture meter was measured, and the operation of the moisture vaporizer was stabilized.

Next, a tray on which no measurement sample was placed was inserted into the moisture vaporizer, measurement of the water content was performed for 20 minutes, and a blank value was obtained.

Subsequently, a tray on which a measurement sample was placed was inserted into the moisture vaporizer, measurement of the water content was performed for 20 minutes, and a measured value of the water content of the measurement sample was obtained.

The water content of the measurement sample was calculated from the following formula.

$$\text{Water content (ppm by mass)} = [\text{Measured value of water content of measurement object} - \text{blank value}]/\text{feed amount of measurement sample}$$

[Evaluation Methods]

<Striae>

A projection test was carried out using a light source apparatus, "OPTICAL MODULEX SX-UI251HQ" (manufactured by USHIO INC.). A high-pressure UV lamp, "USH-102D" (manufactured by USHIO INC.) was used as a light source, a white screen was installed at a distance of 1 m therefrom, a testing resin was inserted between the light source and the screen, and a projected image on the screen was observed and judged according to the following criteria.

A: There are no linear irregularities at all in the projected image.

B: There are very thin linear irregularities in the projected image.

C: There are thin linear irregularities in the projected image.

D: There are thick linear irregularities in the projected image. (unacceptable)

E: There are prominent linear irregularities in the projected image. (unacceptable)

<White Turbidity>

In a dark box, a region extending from the geometric center to 30 mm or less of the diameter of a spectacle lens substrate was observed by visual inspection under a fluorescent lamp, and the results were judged according to the following criteria.

A: There is no white turbidity at all in the resin.

B: There is very light white turbidity in the resin.

C: There is light white turbidity in the resin.

D: There is dense white turbidity in the resin. (unacceptable)

[Production of Spectacle Lens Substrate]

Example 1

(Step (1))

50.6 parts of 1,3-bis(isocyanatomethyl)benzene, 0.10 parts of butoxyethyl acid phosphate "JP-506H" (manufactured by Johoku Chemical Co., Ltd.) as a mold release agent, and 0.50 parts of an ultraviolet absorber "SEESORB 701" (manufactured by SHIPRO KASEI KAISHA, LTD.) were mixed, the mixture was dissolved, and at the same time, a degassing treatment was carried out for one hour under reduced pressure conditions at 200 Pa.

The water content of composition A after the degassing treatment was 100 ppm.

(Step (2))

0.010 parts of dimethyl tin dichloride as a polymerization catalyst was mixed with 49.4 parts of a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, the mixture was dissolved, and at the same time, a degassing treatment was carried out for one hour under reduced pressure conditions at 200 Pa.

The water content of composition B after the degassing treatment was 800 ppm.

(Step (3))

The composition A obtained in step (1) and the composition B obtained in step (2) were mixed, and a uniform polymerizable composition was obtained. The water content of the polymerizable composition was 450 ppm.

The polymerizable composition was subjected to filtration with a polytetrafluoroethylene (hereinafter, also referred to as "PTFE") filter having a pore size of 5.0 μm.

Meanwhile, the above-described respective processes were carried out at a liquid temperature of 10° C.

(Injection Step)

The polymerizable composition obtained after filtration was injected into a molding die formed from a glass mold having a diameter of 75 mm and −4.00 D and a tape. Injection was carried out immediately after completion of the preparation of the polymerizable composition, after 3 hours, and after 5 hours. Meanwhile, during those injections, the polymerizable composition was stored at 10° C.

(Polymerization Step and Annealing)

The molding die was inserted into an electric furnace, gradually heated from 15° C. to 120° C. over 20 hours, and maintained for two hours, and thereby polymerization (curing reaction) was induced. After completion of the polymerization, the molding die was taken out from the electric furnace, the resulting product was released from the molding die, and thereby a cured product (spectacle lens substrate made of a polythiourethane-based resin). The spectacle lens substrate thus obtained was further annealed for three hours in an annealing furnace at an internal furnace temperature of 120° C. Then, the evaluations of striae and white turbidity as described above were carried out, and the results are presented in Table 1.

Examples 2 to 5

Lenses were produced in the same manner as in Example 1, except that the water contents after the respective steps were adjusted to the amounts described in Table 1.

Comparative Example 1

50.6 parts of 1,3-bis(isocyanatomethyl)benzene, 0.10 parts of butoxyethyl acid phosphate "JP-506H" (manufactured by Johoku Chemical Co., Ltd.) as a mold release agent, and 0.50 parts of an ultraviolet absorber "SEESORB 701" (manufactured by SHIPRO KASEI KAISHA, LTD.) were mixed, and the mixture was dissolved. The water content of this composition was 240 ppm.

Furthermore, 49.4 parts (water content 1,100 ppm by mass) of a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, and 0.010 parts (water content 1,000 ppm by mass) of dimethyl tin dichloride as a polymerization catalyst were mixed, and the mixture was added and mixed into the above-mentioned composition to obtain a mixed liquid. This polymerizable composition was subjected to a degassing treatment for one hour under reduced pressure conditions at 200 Pa, and then was filtered with a PTFE filter having a pore size of 5.0 μm. The water content of the polymerizable composition after preparation was 450 ppm by mass. Meanwhile, the above-described mixing and dissolving were carried out at a liquid temperature of 10° C.

The procedure after the injection step was carried out in the same manner as in Example 1, and thus a spectacle lens substrate was obtained.

Comparative Examples 2 and 3

Spectacle lens substrates were produced in the same manner as in Comparative Example 1, except that the water contents of the isocyanate compound and the thiol compound before degassing were the amounts described in Table 1, the time for the degassing treatment after preparation was adjusted, and the water content of the polymerizable composition was adjusted to the amounts described in Table 1.

Comparative Example 4

A lens was produced in the same manner as in Example 3, except that 0.010 parts of dimethyl tin dichloride as a polymerization catalyst was also dissolved in the composition A like other additives, and was not dissolved in the mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The water contents of the respective solutions were as described in Table 1.

TABLE 1

| Example/Comparative Example | Mixing Water content (ppm by mass) | | | Addition of catalyst | Evaluation | | | |
|---|---|---|---|---|---|---|---|---|
| | | | | | Striae | | | White turbidity |
| | Composition A*1 | Composition B*1 | Polymerizable composition | | Immediately after preparation | 3 Hours after preparation | 5 Hours after preparation | |
| Example 1 | 100 | 800 | 450 | Step (2) | A | A | A | B |
| Example 2 | 100 | 20 | 60 | Step (2) | A | A | B | A |
| Example 3 | 20 | 20 | 20 | Step (2) | A | A | A | A |
| Example 4 | 100 | 100 | 100 | Step (2) | A | A | A | A |
| Example 5 | 20 | 480 | 250 | Step (2) | A | A | A | A |
| Comparative Example 1 | 240 | 1100 | 450 | Step (2) | B | D | E | D |
| Comparative Example 2 | 240 | 320 | 280 | Step (2) | B | C | D | B |
| Comparative Example 3 | 20 | 1100 | 10 | Step (2) | A | B | D | A |
| Comparative Example 4 | 20 | 20 | 20 | Step (1) | A | B | D | A |

*1 In the Comparative Examples, the water content of the composition including an isocyanate component is described in composition A column, and the water content of the composition including a polythiol component is described in composition B column.

As described above, it can be seen from the results of Examples and Comparative Examples that when the water contents of the composition A and the composition B are adjusted to predetermined values or less, the generation of striae is reduced even if the polymerizable composition is stored for a long time period after preparation.

In particular, when the water content of the composition A is reduced, the generation of striae can be particularly suppressed even if the polymerizable composition is stored for a long time period after preparation.

Furthermore, when the polymerization catalyst is added in step (2), the generation of striae can be particularly notably suppressed even if the polymerizable composition is stored for a long time period after preparation.

Meanwhile, it can be seen that white turbidity is suppressed by reducing the overall water content of the polymerizable composition.

Finally, the embodiments of the present disclosure will be summarized.

An embodiment of the present disclosure relates to a method for producing a polymerizable composition, the method including:
- step (1) of preparing composition A having a water content of 200 ppm by mass or less, the composition A including a polyisocyanate component but not including a polymerization catalyst;
- step (2) of preparing composition B having a water content of 1,000 ppm by mass or less, the composition B including a polythiol component; and
- step (3) of mixing the composition A and the composition B and obtaining a polymerizable composition.

Furthermore, an embodiment of the present disclosure relates to a method for producing an optical component, the method including:
- a step of injecting the above-mentioned polymerizable composition into a molding die; and
- a step of polymerizing the polymerizable composition.

By having the above-described configuration, a method for producing a polymerizable composition that suppresses the generation of striae at the time of obtaining an optical component even if the polymerizable composition is stored for a long time period after preparation, and a method for producing an optical component, can be provided.

The embodiments disclosed herein are only examples in every respect and should not be understood restrictively. The scope of the present invention is defined not by the above description but by the claims, and all modifications made within the meaning and scope equivalent to the claims are intended to be included therein.

The invention claimed is:

1. A method for producing a polymerizable composition, the method comprising:
   step (1) of adjusting a water content of a composition A comprising a polyisocyanate component to be 200 ppm by mass or less, the composition A not including a polymerization catalyst;
   step (2) of mixing a polythiol component and a polymerization catalyst, thereby obtaining a composition B and then adjusting a water content of the composition B to be 1,000 ppm by mass or less; and
   step (3) of mixing the composition A and the composition B, thereby obtaining a polymerizable composition,
   wherein the polyisocyanate component is at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate,
   the polythiol component is at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol trimethylolpropane tris(2-mercaptoacetate), trimethylolpropane -tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), and
   the polymerization catalyst is a tin compound or a nitrogen-containing compound.

2. The method for producing a polymerizable composition according to claim 1, wherein in the step (1), the water content of the composition A is 40 ppm by mass or less.

3. The method for producing a polymerizable composition according to claim 1, wherein in step (1), the water content is reduced under reduced pressure conditions.

4. The method for producing a polymerizable composition according to claim 1, wherein in step (2), the water content is reduced under reduced pressure conditions.

5. The method for producing a polymerizable composition according to claim 1, wherein the composition A further includes a mold release agent.

6. The method for producing a polymerizable composition according to claim 1, wherein the composition A further includes an ultraviolet absorber.

7. The method for producing a polymerizable composition according to claim 1, wherein the polymerizable composition has a water content of 300 ppm by mass or less.

* * * * *